US012036157B2

(12) United States Patent
Ma et al.

(10) Patent No.: US 12,036,157 B2
(45) Date of Patent: Jul. 16, 2024

(54) SUPPPORT PAD COUPLING MECHANISM FOR SURGICAL TABLE EXTENSION UNIT AND SURGICAL TABLE

(71) Applicant: Baxter Medical Systems GmbH + Co. KG, Saalfeld (DE)

(72) Inventors: Debao Ma, Su Zhou (CN); Jipeng Wang, Su Zhou (CN); Qiang Hao, Su Zhou (CN); Aaron Foo, Singapore (SG); Guoxiang Wang, Singapore (SG)

(73) Assignee: Baxter Medical Systems GmbH + Co. KG, Saalfeld (DE)

(*) Notice: Subject to any disclaimer, the term of this patent is extended or adjusted under 35 U.S.C. 154(b) by 851 days.

(21) Appl. No.: 17/090,507

(22) Filed: Nov. 5, 2020

(65) Prior Publication Data

US 2021/0128385 A1 May 6, 2021

(30) Foreign Application Priority Data

Nov. 5, 2019 (CN) ........................ 201921893872.X

(51) Int. Cl.

*A61G 13/12* (2006.01)
*A61G 13/02* (2006.01)
*A61G 13/10* (2006.01)

(52) U.S. Cl.

CPC ........... *A61G 13/126* (2013.01); *A61G 13/02* (2013.01); *A61G 13/10* (2013.01); *A61G 13/101* (2013.01);

(Continued)

(58) Field of Classification Search

CPC .... A61G 13/126; A61G 13/02; A61G 13/101; A61G 13/129; A61G 13/10;

(Continued)

(56) References Cited

U.S. PATENT DOCUMENTS 2,638,606 A * 5/1953 Austin ................. A47C 23/063 5/247
2,717,593 A * 9/1955 Murphy ............... A61G 13/009 601/56

(Continued)

FOREIGN PATENT DOCUMENTS

EP 2705822 A1 * 3/2014 ............ A61G 13/00
GB 2516109 A 1/2015
WO WO-2013069952 A1 * 5/2013 ............ A61G 13/06

*Primary Examiner* — David R Hare
*Assistant Examiner* — Deborah Talitha Gedeon
(74) *Attorney, Agent, or Firm* — Price Heneveld LLP

(57) ABSTRACT

A support pad coupling mechanism for a surgical table extension unit and a surgical table are disclosed. The surgical table extension unit includes an extension adapter and a support pad. A lower side of the support pad is provided with two coupling plates that are perpendicular to the support pad. Each coupling plate is provided with a hook portion and a first position-limiting post. The first position-limiting posts extend along a direction perpendicular to the coupling plates. The extension adapter is provided with two second position-limiting posts that cooperate with the hook portions and two position-limiting recessed portions that cooperate with the first position-limiting posts. When the support pad and the extension adapter are coupled together, the first position-limiting posts are positioned in the position-limiting recessed portions and the hook portions are hooked onto the second position-limiting posts.

17 Claims, 6 Drawing Sheets

(52) U.S. Cl.
CPC ........ *A61G 13/128* (2013.01); *A61G 13/1285* (2013.01); *A61G 13/129* (2013.01)

(58) Field of Classification Search
CPC .. A61G 13/1205; A61G 13/121; A61G 13/04; A61G 13/06; A61G 13/08; A61G 13/128; A61G 13/1285; A61G 13/0036; Y10T 403/32401; Y10T 403/59; Y10T 403/595; A61H 2201/0134
See application file for complete search history.

(56) References Cited

U.S. PATENT DOCUMENTS

| | | | | |
|---|---|---|---|---|
| 3,732,860 | A * | 5/1973 | Thurmer | A47C 21/006 5/109 |
| 4,077,664 | A * | 3/1978 | Harder, Jr. | B29C 44/1271 16/431 |
| 5,103,513 | A * | 4/1992 | King | B60N 2/70 5/118 |
| 7,243,387 | B2 | 7/2007 | Schindler | |
| 7,818,839 | B2 | 10/2010 | Koch et al. | |
| 7,896,569 | B2 | 3/2011 | Katzenstein | |
| 8,740,492 | B2 | 6/2014 | Andreasen | |
| 8,997,281 | B2 | 4/2015 | Daley et al. | |
| 10,159,617 | B2 | 12/2018 | Campbell et al. | |
| 10,267,350 | B2 | 4/2019 | Lassetter et al. | |
| 2002/0170115 | A1* | 11/2002 | Borders | A61G 13/101 5/624 |
| 2005/0125899 | A1 | 6/2005 | Hanson et al. | |
| 2010/0011504 | A1 | 1/2010 | Hegarat et al. | |
| 2013/0247301 | A1* | 9/2013 | Daley | A61G 13/101 5/613 |

* cited by examiner

SUPPPORT PAD COUPLING MECHANISM FOR SURGICAL TABLE EXTENSION UNIT AND SURGICAL TABLE

CROSS-REFERENCE TO RELATED APPLICATION

This application claims priority to Chinese Utility Model Application No. 201921893872.X filed on Nov. 5, 2019, entitled "COUPLING MECHANISM OF SUPPORT PAD FOR SURGICAL TABLE EXTENSION UNIT AND SURGICAL TABLE," the disclosure of which is hereby incorporated by reference.

FIELD OF THE DISCLOSURE

The present disclosure relates to a surgical table, and more specifically relates to a support pad coupling mechanism for a surgical table extension unit and a surgical table.

BACKGROUND TECHNOLOGY

A surgical table is a platform for performing surgical operations and is used to support a patient during surgical operations. During surgery, the surgical table may be adjusted to different positions as needed in order to fully expose the surgical field of view. Most of the existing surgical tables adopt a modular design, and various modules can be selected according to needs so that diversified surgical requirements can be met. Some surgical tables are also equipped with an expansion unit, which can be easily expanded. The expansion unit generally includes a detachable support pad. However, existing support pad coupling mechanisms have complex structure and high cost problems.

SUMMARY OF THE DISCLOSURE

One of the objects of the present disclosure is to provide a support pad coupling mechanism which is low in cost, and can help to lower the cost of surgical tables, and make the operation of a support pad more reliable and convenient.

In an embodiment of the support pad coupling mechanism for a surgical table extension unit according to the present application, the surgical table extension unit includes an extension adapter and a support pad. A lower side of the support pad is provided with two coupling plates that are perpendicular to the support pad. Each coupling plate is provided with a hook portion and a first position-limiting post. The first position-limiting posts extend along a direction perpendicular to a respective one of the coupling plates. The extension adapter is provided with two second position-limiting posts that respectively cooperate with a respective hook portion, and two position-limiting recessed portions that respectively cooperate with a respective first position-limiting post. When the support pad and the extension adapter are coupled together, the first position-limiting posts of the coupling plates are positioned in the position-limiting recessed portions, and the hook portions of the coupling plates are hooked onto the second position-limiting posts.

In another embodiment of the support pad coupling mechanism for a surgical table extension unit according to the present application, the extension adapter includes two coupling portions that cooperate with the two coupling plates, respectively. The coupling portions are each provided with a cooperating face that cooperates with a respective one of the coupling plates. The second position-limiting posts are provided on and perpendicular to the cooperating faces, respectively. The position-limiting recessed portions are formed on upper surfaces of the coupling portions, respectively.

In another embodiment of the support pad coupling mechanism for a surgical table extension unit according to the present application, the two coupling plates are parallel to each other and are disposed close to one end of the support pad.

In another embodiment of the support pad coupling mechanism for a surgical table extension unit according to the present application, the two coupling plates are disposed close to two side edges of the support pad respectively.

In another embodiment of the support pad coupling mechanism for a surgical table extension unit according to the present application, the surgical table extension unit further includes an extension beam coupled with the extension adapter. The lower side of the support pad is provided with a cushion block, and the cushion block is provided with a groove that fits to the extension beam.

One of the objects of the present disclosure is to also provide a surgical table. The surgical table is provided with the above-mentioned support pad coupling mechanism for a surgical table extension unit.

The implementation of the support pad coupling mechanism for a surgical table extension unit and the surgical table of the present disclosure has the following beneficial effects: the support pad coupling mechanism of the present disclosure is convenient to operate and can effectively lower the cost of manufacturing.

BRIEF DESCRIPTION OF THE DRAWINGS

The present disclosure will be further explained below in conjunction with the embodiments and the drawings, wherein.

DETAILED DESCRIPTION

Figure 1:
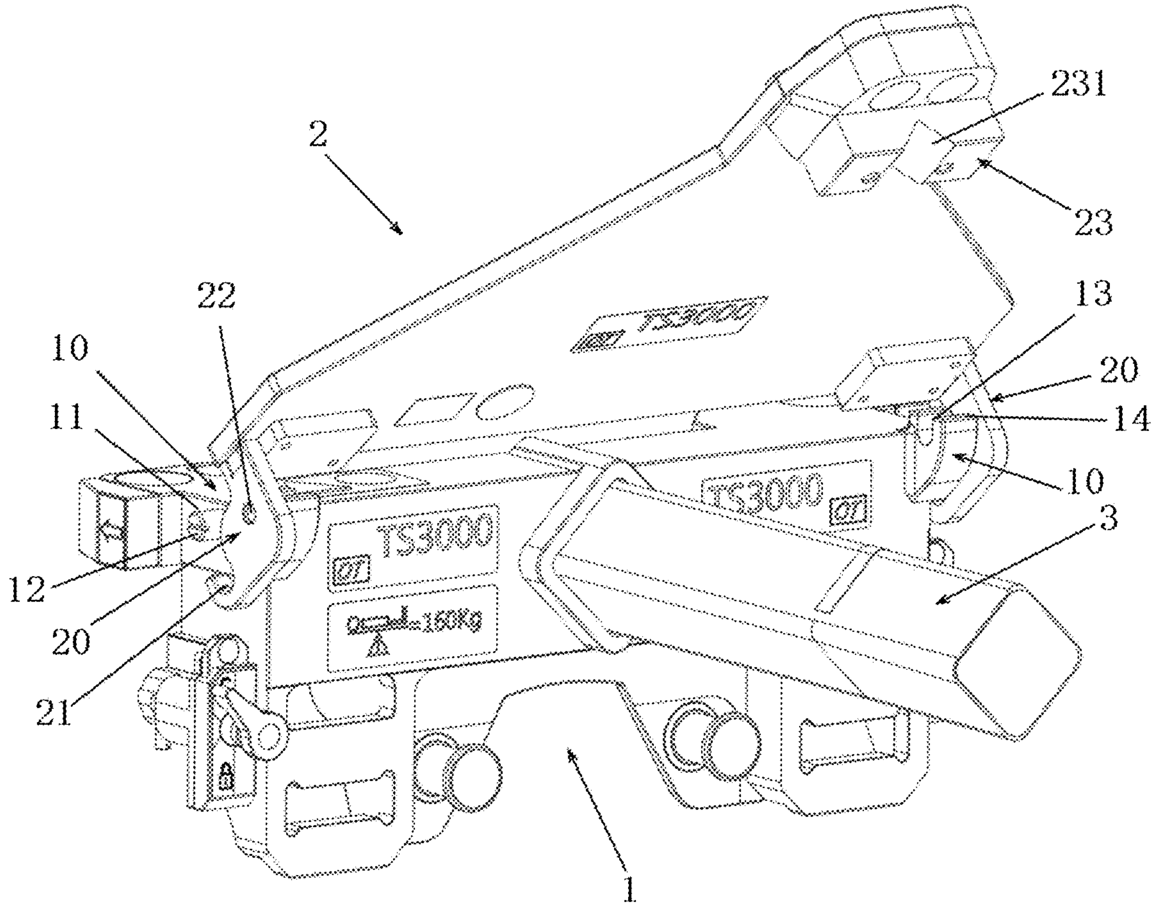
FIG. 1 is a schematic diagram showing the assembling of a support pad coupling mechanism for a surgical table extension unit, according to an embodiment of the present disclosure.
Figure 2:
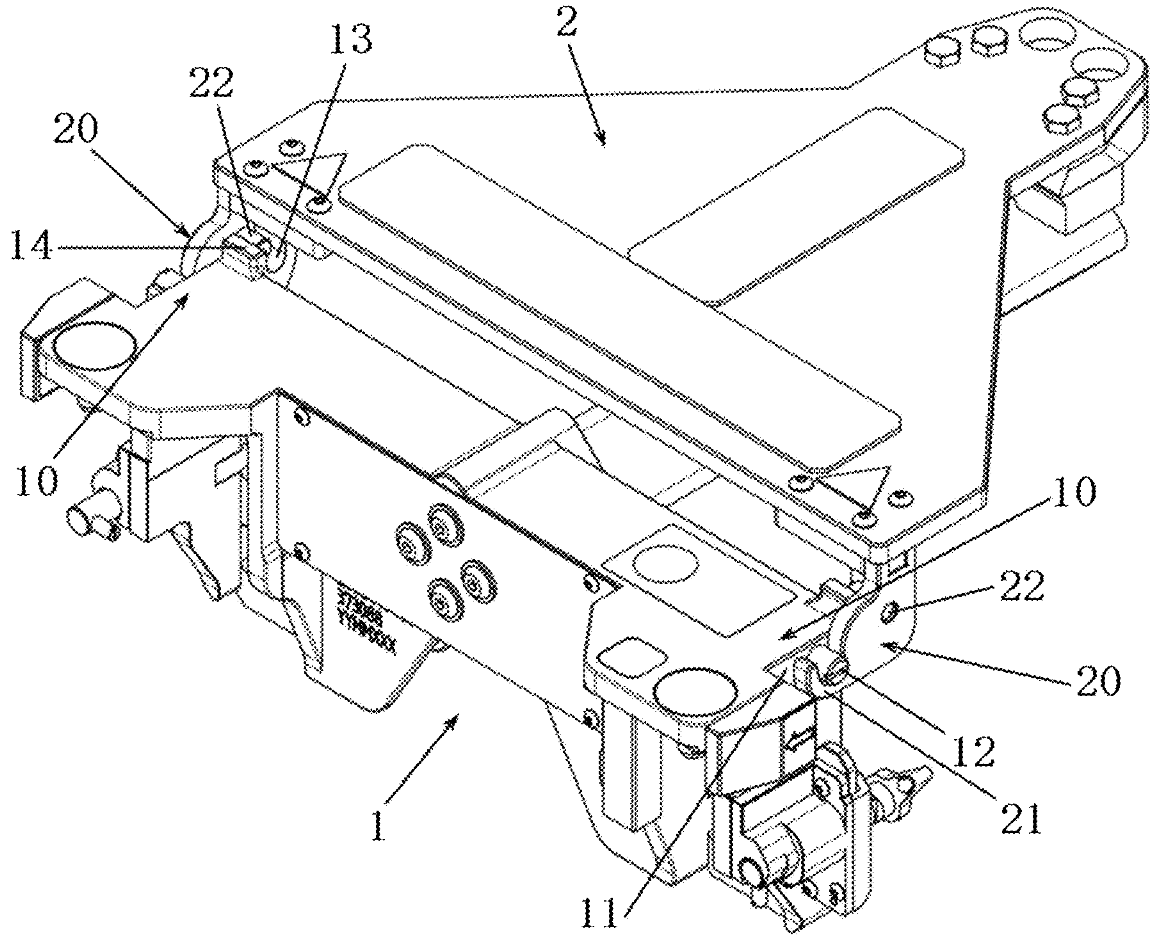
FIG. 2 is a side perspective view of a support pad coupling mechanism for a surgical table extension unit, after assembly, according to an embodiment of the present disclosure.
Figure 3:
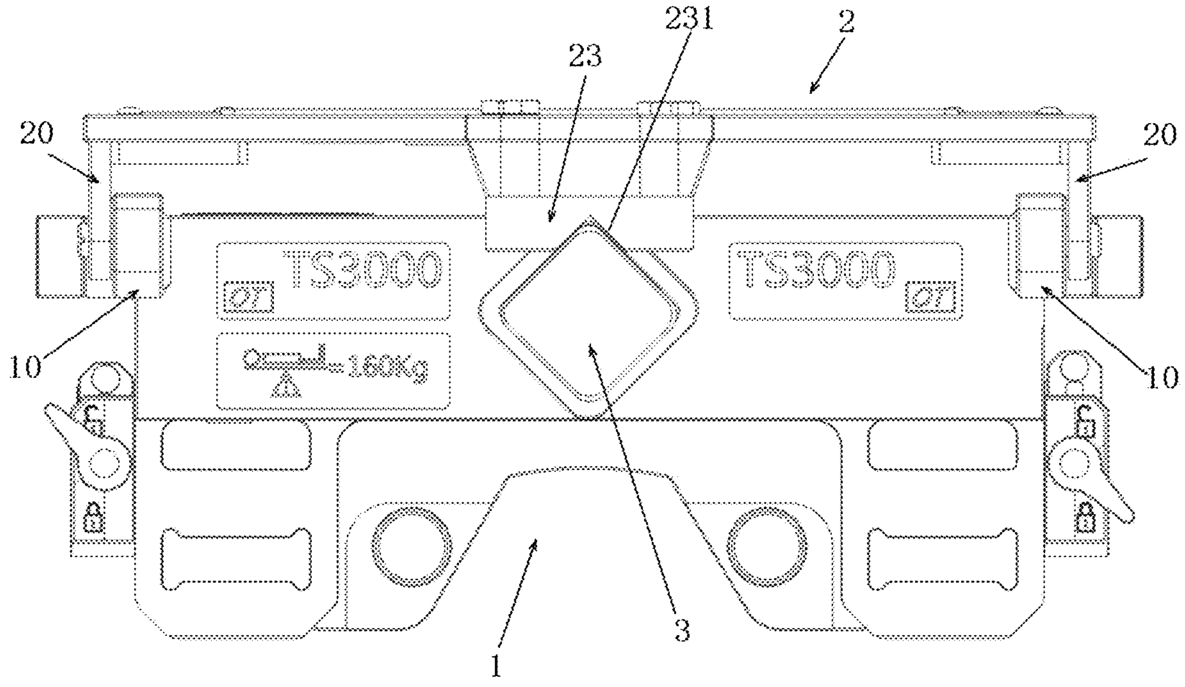
FIG. 3 is a rear elevational view of a support pad coupling mechanism for a surgical table extension unit, according to an embodiment of the present disclosure.
Figure 4:
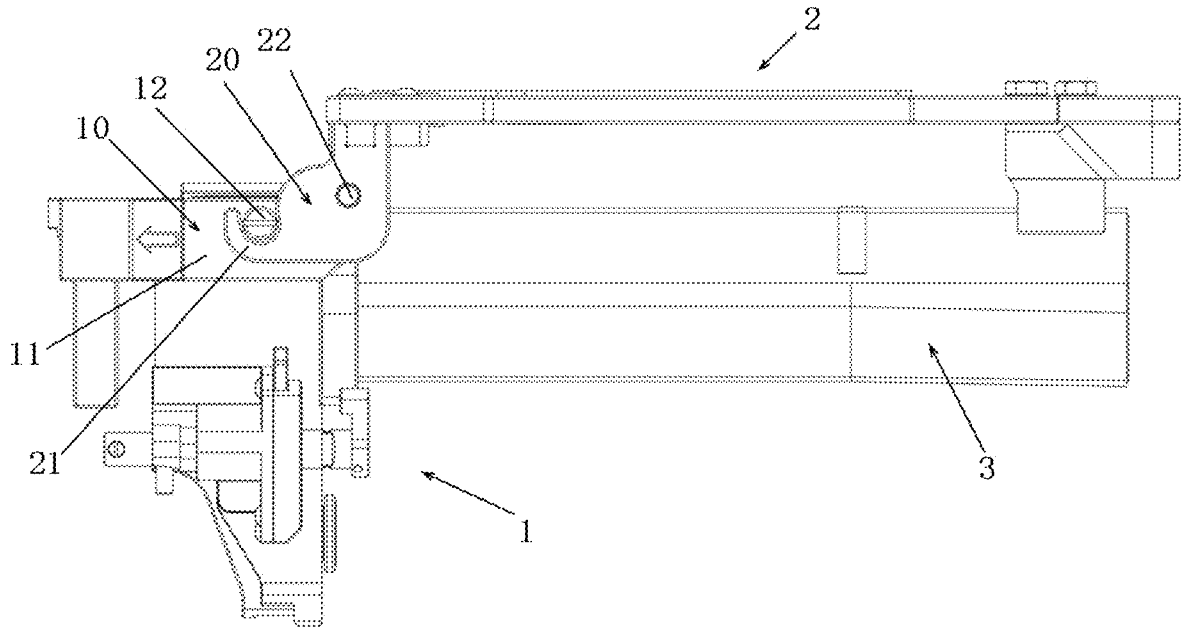
FIG. 4 is a side elevational view of a support pad coupling mechanism for a surgical table extension unit, according to an embodiment of the present disclosure.

In order to have a clear understanding of the technical features, objectives, and advantages of the present disclosure, specific embodiments of the present disclosure will be described in detail below with reference to the accompanying drawings.

The embodiments of the support pad coupling mechanism for a surgical table extension unit and the surgical table of the present disclosure are described below in detail. Examples of these embodiments are shown in the accompanying drawings. The same or similar reference numeral denotes the same or similar elements, or elements having the same or similar function throughout the specification.

In the description of the support pad coupling mechanism for a surgical table extension unit and the surgical table of the present disclosure, it should be understood that the terms “front”, “rear”, “upper”, “lower”, “upper end”, “lower end”, “upper portion”, “lower portion”, etc. indicate spatial relationship that is based on the orientation or positional relationship shown in the drawings, and are only used for the convenience of describing the present disclosure and simplifying the description, rather than indicating or implying that the device or element referred to must have a specific orientation and be constructed and operated in a specific orientation. Therefore, these terms cannot be understood as a limitation to the present disclosure. In addition, the terms “first” and “second” are used for descriptive purposes only, and cannot be understood as indicating or implying relative importance.

FIGS. 1-4 are illustrations of a support pad coupling mechanism for a surgical table extension unit according to an embodiment of the present disclosure. In the present embodiment, the surgical table extension unit includes an extension adapter 1 and a support pad 2. The surgical table extension unit is used for extending the function of a surgical table 100. Certain functional components may be added on the surgical table extension unit to satisfy surgical needs. The support pad 2 may be detachably connected with the extension adapter 1. The extension adapter 1 may be connected with an upright column 110 of the surgical table (see FIG. 6).

Referring to FIGS. 1-4, a lower side of the support pad 2 is provided with two coupling plates 20 that are perpendicular to the support pad 2. The coupling plates 20 can be mounted on the support pad 2 using various types of mechanical fasteners (for example, screws, bolts, rivets, etc.) and/or bonding part (for example, thermal bonding part, welding, etc.). Each coupling plate 20 is provided with a hook portion 21 and a first position-limiting post 22. Each first position-limiting post 22 extends along a direction perpendicular to a respective one of the coupling plates 20. The first position-limiting posts 22 can be mounted on the coupling plates 20 by screw threads, or welding, or any other appropriate method. The two coupling plates 20 may be parallel to each other and disposed close or proximate to one end of the support pad 2. The two coupling plates 20 may be disposed close or proximate to two side edges of the support pad 2, respectively.

Referring still to FIGS. 1-4, the extension adapter 1 is provided with two second position-limiting posts 12 that cooperate with the hook portions 21, respectively, and two position-limiting recessed portions 13 that cooperate with the first position-limiting posts 22, etc. When the support pad 2 and the extension adapter 1 are coupled together, the first position-limiting posts 22 of the coupling plates 20 are positioned in the position-limiting recessed portions 13, and the hook portions 21 of the coupling plates 20 are hooked onto the second position-limiting posts 12. Specifically, in the present embodiment, the extension adapter 1 includes two coupling portions 10 that cooperate with the two coupling plates 20, respectively. Each of the coupling portions 10 may be provided with a cooperating face 11 that cooperates with a respective one of the coupling plates 20. The second position-limiting posts 12 are provided on and perpendicular to the cooperating faces 11, respectively. The second position-limiting posts 12 can be connected on the cooperating faces 11 by screw threads, or welding, or any other appropriate method. The position-limiting recessed portions 13 are formed on upper surfaces 14 of the coupling portions 10, respectively. The position-limiting recessed portions 13 may be in the shape of a circular arc.

Referring still to FIG. 1, when attaching the support pad 2 to the extension adapter 1, the support pad 2 is placed on the extension adapter 1 at an angle. The two first position-limiting posts 22 of the two coupling plates 20 of the support pad 2 are first put into the two position-limiting recessed portions 13 of the two coupling portions 10 of the extension adapter 1. The support pad 2 is then placed horizontally so that the hook portions 21 of the two coupling plates 20 are hooked onto the two second position-limiting posts 12, thereby attaching the support pad 2 on the extension adapter 1. To detach the support pad 2 from the extension adapter 1, a reverse order of the attaching procedure can be carried out.

Referring again to FIGS. 1 and 3, the surgical table extension unit further includes an extension beam 3 that is coupled with the extension adapter 1. The extension beam 3 extends outwardly from the extension adapter 1. The extension beam 3 can be used for mounting thereon extension components in order to satisfy certain functional needs. The lower side of the support pad 2 may be provided with a cushion block 23, and the cushion block 23 may be provided with a groove 231 that fits to the extension beam 3. When the support pad 2 is mounted on the extension adapter 1, the extension beam 3 is located in the groove 231 such that the support pad 2 can have a better support and can be more stable.

Figure 5:
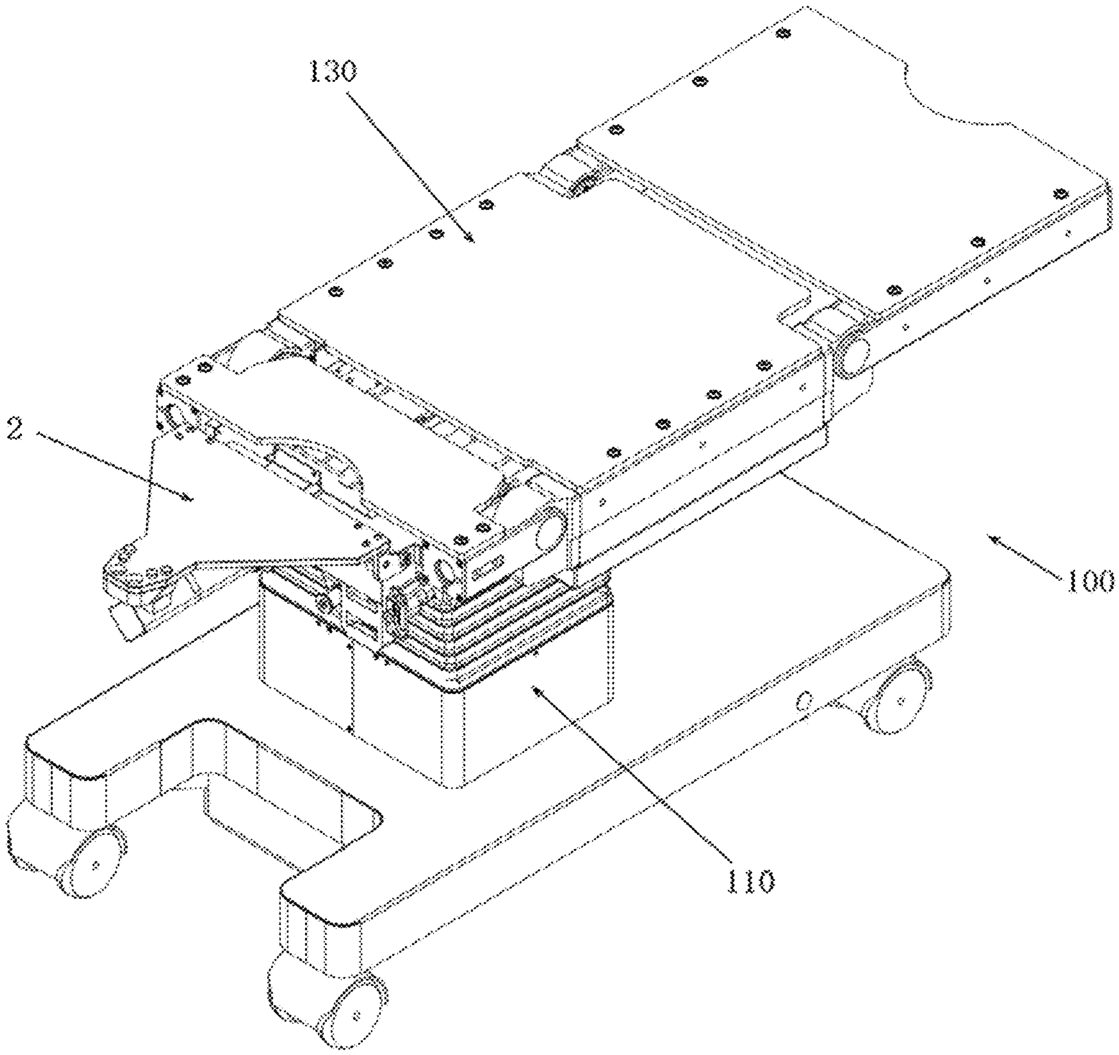
FIG. 5 is a side perspective view of a surgical table, according to an embodiment of the present disclosure.
Figure 6:
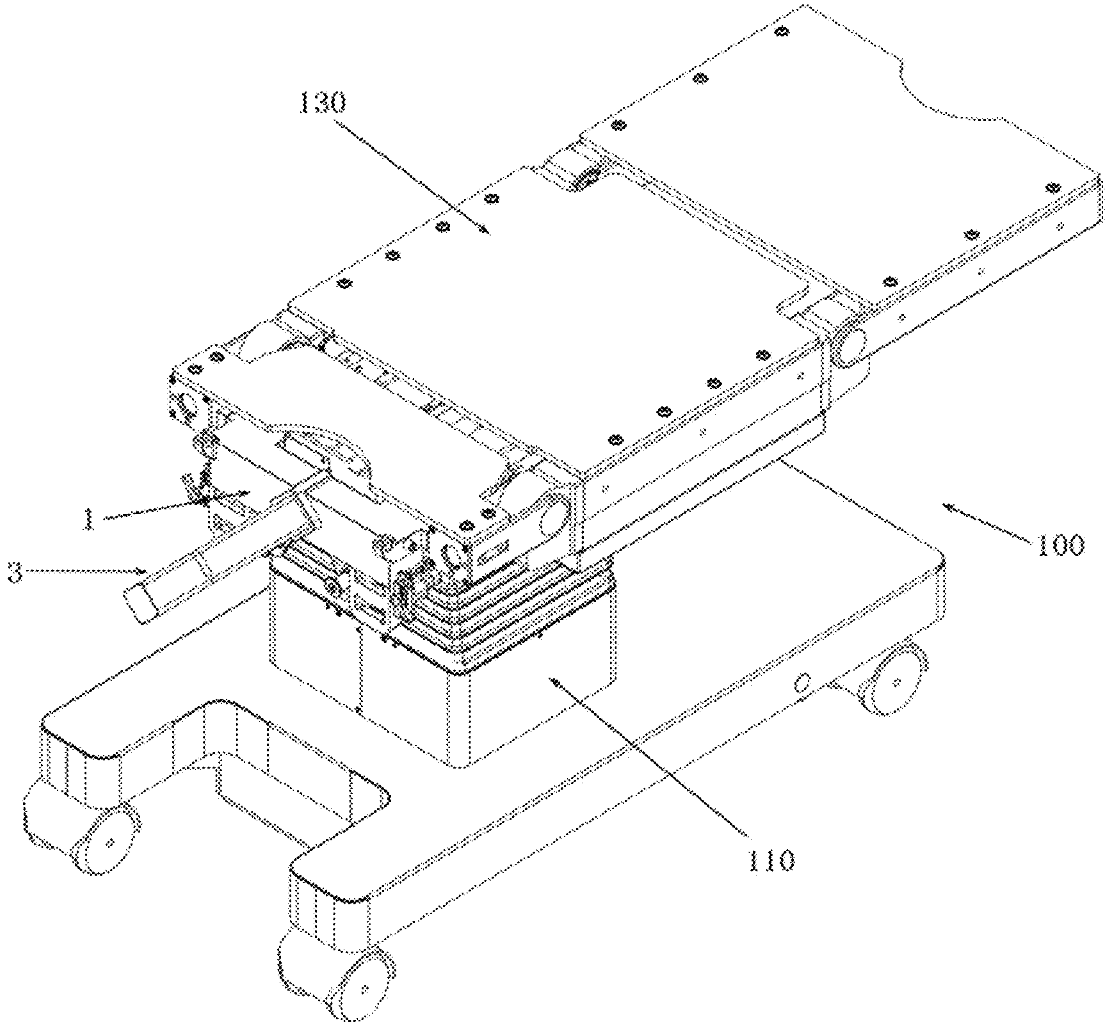
FIG. 6 is a side perspective view of the surgical table, shown in FIG. 5, after the support pad is detached.
Figure 7:
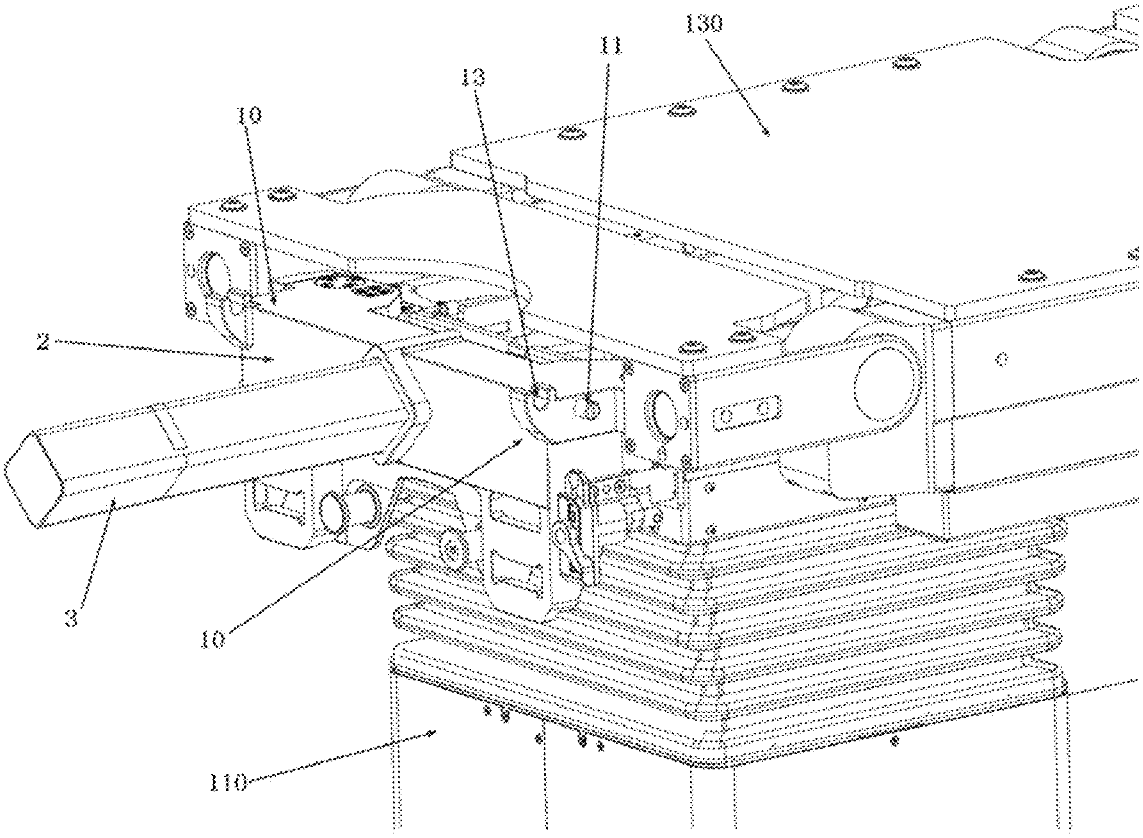
FIG. 7 is a partial enlarged perspective view of the surgical table shown in FIG. 6.

FIGS. 5-7 are illustrations of the surgical table 100 according to an embodiment of the present disclosure. In this embodiment, the surgical table 100 includes the upright column 110, and a surgical table extension unit mounted on the upright column 110. This surgical table extension unit is the surgical table extension unit shown in FIGS. 1-4. In the present embodiment, the extension adapter 1 can be detachably connected with the upright column 110, and can be locked on the upright column 110. The upright column 110 can be extended and retracted along a vertical direction. A top end of the upright column 110 is provided with a bed body 130 for supporting a patient. The surgical table extension unit of the surgical table 100 shown in FIGS. 5-7 includes an extension adapter 1 and a support pad 2. The support pad 2 can be detachably connected with the extension adapter 1. The coupling structures of the support pad 2 and the extension adapter 1 are shown in FIGS. 1-4 and the above related description, and will not be repeated here.

The support pad coupling mechanism of the present disclosure is convenient to operate and can effectively lower the cost of manufacturing.

The embodiments of the present disclosure are described above with reference to the accompanying drawings. However, the present disclosure is not limited to the above-mentioned specific embodiments. The above-mentioned specific embodiments are only illustrative and not restrictive. Under the enlightenment of the present disclosure, a person of ordinary skill in the art can make many forms, without departing from the purpose of the present disclosure and the scope of protection of the claims, and all of these forms shall fall within the protection of the present disclosure.

What is claimed is:

1. A support pad coupling mechanism for a surgical table extension unit, the surgical table extension unit comprising:

a support pad, wherein a lower side of the support pad includes at least one coupling plate that is perpendicular to the support pad, wherein the at least one coupling plate comprises:

a hook portion; and a first position-limiting post, wherein the first position-limiting post extends along a direction perpendicular to the at least one coupling plate;

an extension adapter comprising:

a second position-limiting post that cooperates with the hook portion; and a position-limiting recessed portion that cooperates with the first position-limiting post, and wherein, the first position-limiting post of the at least one coupling plate is positioned in the position-limiting recessed portion and the hook portion of the at least one coupling plate is hooked onto the second position-limiting post when the support pad and the extension adapter are coupled together; and an extension beam coupled with the extension adapter, wherein the lower side of the support pad includes a cushion block, and wherein the cushion block includes a groove that receives the extension beam.

2. The support pad coupling mechanism of claim 1, wherein the extension adapter comprises:

a coupling portion that cooperates with the at least one coupling plate, wherein the coupling portion includes a cooperating face that cooperates with the at least one coupling plate, wherein the second position-limiting post is provided on and perpendicular to the cooperating face, and wherein the position-limiting recessed portion is formed on an upper surface of the coupling portion.

3. The support pad coupling mechanism of claim 1, wherein the at least one coupling plate includes a first coupling plate parallel to a second coupling plate, and wherein each coupling plate is disposed proximate to one end of the support pad.

4. The support pad coupling mechanism of claim 1, wherein the at least one coupling plate is disposed proximate to a side edge of the support pad.

5. The support pad coupling mechanism of claim 1, wherein the position-limiting recessed portion is in a shape of a circular arc.

6. The support pad coupling mechanism of claim 1, wherein the support pad is detachably connected with the extension adapter.

7. The support pad coupling mechanism of claim 1, wherein the at least one coupling plate is mounted on the support pad by thermal bonding.

8. The support pad coupling mechanism of claim 1, wherein the at least one coupling plate is mounted on the support pad by welding.

9. The support pad coupling mechanism of claim 1, wherein the first position-limiting post is mounted on the at least one coupling plate by welding.

10. A surgical table, comprising:

an upright column; and a surgical table extension unit mounted on the upright column, wherein the surgical table extension unit comprises:

a support pad, wherein a lower side of the support pad is provided with a coupling plate that is perpendicular to the support pad, wherein the coupling plate includes a hook portion and a first position-limiting post, wherein the first position-limiting post extends along a direction perpendicular to the coupling plate;

an extension adapter, wherein the extension adapter includes a second position-limiting post that cooperates with the hook portion and a position-limiting recessed portion that cooperates with the first position-limiting post, and wherein the first position-limiting post of the coupling plate is positioned in the position-limiting recessed portion and the hook portion of the coupling plate is hooked onto the second position-limiting post when the support pad and the extension adapter are coupled together; and an extension beam coupled with the extension adapter, wherein the lower side of the support pad includes a cushion block, and wherein the cushion block is provided with a groove that fits to the extension beam.

11. The surgical table of claim 10, wherein the extension adapter comprises:

a coupling portion that cooperates with the coupling plate, wherein the coupling portion is provided with a cooperating face that cooperates with the coupling plate, wherein the second position-limiting post is provided on and perpendicular to the cooperating face, and wherein the position-limiting recessed portion is formed on an upper surface of the coupling portion.

12. The surgical table of claim 10, wherein the coupling plate is disposed proximate to one end of the support pad.

13. The surgical table of claim 10, wherein the coupling plate is disposed proximate to a side edge of the support pad.

14. A surgical table extension unit of a surgical table, the surgical table extension unit comprising:

a support pad, wherein a lower side of the support pad is provided with a coupling plate, wherein the coupling plate includes a hook portion and a first position-limiting post;

an extension adapter including a second position-limiting post that cooperates with the hook portion and a position-limiting recessed portion that cooperates with the first position-limiting post, and wherein the first position-limiting post of the coupling plate is positioned in the position-limiting recessed portion and the hook portion of the coupling plate is hooked onto the second position-limiting post when the support pad and the extension adapter are coupled together; and an extension beam coupled with the extension adapter, wherein the lower side of the support pad includes a cushion block, and wherein the cushion block includes a groove that mates with the extension beam.

15. The surgical table extension unit of claim 14, wherein the extension adapter comprises:

a coupling portion that cooperates with the coupling plate, wherein the coupling portion includes a cooperating face that cooperates with the coupling plate, wherein the second position-limiting post is provided on and perpendicular to the cooperating face, and wherein the position-limiting recessed portion is formed on an upper surface of the coupling portion.

16. The surgical table extension unit of claim 14, wherein the coupling plate is disposed proximate to one end of the support pad.

17. The surgical table extension unit of claim 14, wherein the coupling plate is disposed proximate to a side edge of the support pad respectively.

* * * * *